US012795340B2

(12) United States Patent
Young et al.

(10) Patent No.: US 12,795,340 B2
(45) Date of Patent: Nov. 10, 2026

(54) SYSTEM AND METHOD FOR PREDICTING EVENTS AND MANAGING EVACUATIONS

(71) Applicant: Allstate Insurance Company, Northbrook, IL (US)

(72) Inventors: Andrew Young, Livingston, NJ (US); Sarah K. Webster, Wilmington, NC (US); Gabriel Federico Carballo Nunez, Grayslake, IL (US); Marvin Lu, Chicago, IL (US); Howard Hayes, Glencoe, IL (US); Leah M. Birch, Somerville, MA (US)

(73) Assignee: Allstate Insurance Company

( * ) Notice: Subject to any disclaimer, the term of this patent is extended or adjusted under 35 U.S.C. 154(b) by 299 days.

(21) Appl. No.: 18/377,338

(22) Filed: Oct. 6, 2023

(65) Prior Publication Data

US 2025/0119719 A1 Apr. 10, 2025

(51) Int. Cl.

| | |
|---|---|
| ***H04W 4/90*** | (2018.01) |
| ***G06Q 10/04*** | (2023.01) |
| ***G06Q 20/08*** | (2012.01) |
| ***H04L 9/00*** | (2022.01) |

(52) U.S. Cl.

CPC .............. *H04W 4/90* (2018.02); *G06Q 10/04* (2013.01); *G06Q 20/085* (2013.01); *H04L 9/50* (2022.05)

(58) Field of Classification Search

CPC ........ H04W 4/90; G06Q 10/04; G06Q 20/085
USPC ........................................................ 455/404.1
See application file for complete search history.

(56) References Cited

U.S. PATENT DOCUMENTS

| | | | | |
|---|---|---|---|---|
| 8,639,620 | B1 * | 1/2014 | Billman | G06Q 20/105 705/41 |
| 8,650,048 | B1 | 2/2014 | Hopkins, III et al. | |
| 8,760,285 | B2 | 6/2014 | Billman et al. | |
| 10,872,512 | B1 * | 12/2020 | Beveridge | G01W 1/10 |
| 11,222,388 | B2 | 1/2022 | Baumgartner et al. | |
| 11,227,325 | B1 * | 1/2022 | Baral | G06Q 30/0641 |
| 11,436,682 | B2 | 9/2022 | Trundle et al. | |
| 11,519,146 | B2 | 12/2022 | Wani et al. | |

(Continued)

FOREIGN PATENT DOCUMENTS

CN 103810537 B 9/2016

OTHER PUBLICATIONS

Feb. 24, 2025—(US) Non-Final Office Action—U.S. Appl. No. 18/377,353, 25 Pages.

(Continued)

*Primary Examiner* — Maria El-Zoobi

(57) ABSTRACT

A device may obtain data associated with an event and process the data via an evacuation prediction and management engine to obtain an evacuation prediction. When the evacuation prediction indicates that an evacuation order is likely to be issued within a period of time based on the event occurring, the device transmits, via the evacuation prediction and management engine, an evacuation service offering to a user device. Upon a user of the user device confirming acceptance of the evacuation service offering, the device receives a payment for the user for the evacuation service offering. When the event or evacuation order occurs and based on the payment for the evacuation service offering, the device automatically initiates a payment to a user account.

20 Claims, 7 Drawing Sheets

(56) References Cited

U.S. PATENT DOCUMENTS

| | | | | |
|---|---|---|---|---|
| 12,301,654 B2 * | 5/2025 | Unagami | ............ | H04W 40/248 |
| 2013/0103309 A1 * | 4/2013 | Cai | ........................ | G08B 7/066 |
| | | | | 701/515 |

OTHER PUBLICATIONS

@Misc{cooper2022tradeoffsdesigncommunicationfloodrisk}, title={Trade-offs in the design and communication of flood-risk information}, author={Courtney M. Cooper and Sanjib Sharma and Robert E. Nicholas and Klaus Keller}, year={2022}, eprint={2201.01254}, archivePrefix={arXiv}, primaryClass={stat.AP}, (Year: 2022).

Adrian King, "Climate change is rapidly emerging as a threat to the stability of our financial systems", KPMG, 2018, https://kpmg.com/xx/en/home/services/advisory/risk-consulting/internal-audit-risk/sustainability-services/climate-risk-services.html.

Center for Climate Resilience and Decision Science, https://disgeoportal.egs.anl.gov/ClimRR/?page=ClimRR&views=Report-Step-1.

Erika Murphy, CFA, CAIA, "Hedging climate risk: The best defense is a good offense", Wellington Management, Feb. 2022, https://www.wellington.com/en/insights/hedging-climate-risk-best-defense#:~:text=A%20cross%2Dasset%20climate%20hedge,to%20growing%20physical%20cli mate%20risks.

https://riskfactor.com.

K. James Sullivan, Insuring for Climate Change: The Role of Parametric Insurance, Apr. 27, 2023,https://www.lexisnexis.com/community/insights/legal/practical-guidance-journal/b/pa/posts/insuring-for-climate-change-the-role-of-parametric-insurance.

Neal Baumann et al., Deloitte, ClimateWise, Climate product innovation within the insurance sector, 2021 pp. 27-28, https://www.cisl.cam.ac.uk/files/climatewise_climate_product_innovation.pdf.

Ricardo Martinez et al., "Centering around sustainability in financial services firms", Deloitte Insights, Jun. 4, 2021,https://www2.deloitte.com/us/en/insights/industry/financial-services/climate-change-financial-services-risk-opportunities.html.

Sakis Kotsantonis, NBS, How an Innovative Insurance Product Helps Clients Weather Climate Change, Sep. 12, 2016, https://nbs.net/how-an-innovative-insurance-product-helps-clients-weather-climate-change/.

Stacey Mitchell, MLIS et al. (research summary and charts compiled by), Topic: Funding resources to promote disaster resilience and mitigation, National Association of Insurance Commissioners, Feb. 4, 2020, 9 pages, https://uphelp.org/wp-content/uploads/2022/01/Resiliency-and-mitigation-funding.pdf.

* cited by examiner

SYSTEM AND METHOD FOR PREDICTING EVENTS AND MANAGING EVACUATIONS

FIELD

Aspects of the present disclosure relate to systems and methods for predicting catastrophic events and further for managing and assisting individuals to evacuate from an area. Other concepts disclosed relate to a parameterized selection of service offerings for a user related to a triggering event in which a user can determine the characteristics of the trigger event and a configuration of the service offering in response to the occurrence of the event.

BACKGROUND

Climate catastrophes can impact anyone. In some events such as hurricanes, there can be some forewarning, but the models and expectation of a given route for a hurricane can change quickly. Flooding or wildfires can arise without any advanced warning. People after often asked or ordered to evacuate on short notice. In such stressful situations, people have difficulty in determining where to go and what to do and may not be in a financial condition to manage the need for gas, food, and hotels.

When these climate event or other evacuation events occur, people are not necessarily prepared to evacuate their homes for weeks at a time until they can return to repair their homes and lives. Many of these people likely have insurance policies that help with long term risk such as their home being damaged by a hurricane. However, there is no insurance policy to help with the short-term risk or needs such as the immediate need to evaluate an area. In the consumer market, an individual homeowner cannot purchase an insurance policy to cover for short term needs.

Furthermore, there in many cases might be false information that can be reported with respect to evacuations or event conditions. Different sources of information can conflict and confuse people during a very stressful time. It is with these observations in mind, among others, that aspects of the present disclosure were conceived and developed.

SUMMARY

Implementations described and claimed herein address the foregoing by providing systems and methods for predicting and managing evacuations. Introduced herein is an evacuation prediction and management engine that can implement a number of services around evacuations and that can address the needs outlined above. Other concepts disclosed herein include providing a modularized or parametric opportunity to select or tailor a triggering event for the user and the configuration of the service offering if the triggering event occurs. The user can adjust thresholds and costs of the service and interact with a user interface 105 to both determine the configuration of the triggering event plus the configuration of the services which are implemented in the occurrence of the event.

In some aspects, the techniques described herein relate to a method for predicting and managing evacuations, the method including: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and when the event or evacuation order occurs and based on the payment for the evacuation service offering, automatically initiating a payment to a user account.

In some aspects, the techniques described herein relate to a tangible non-transitory computer-readable storage media storing computer-executable instructions which, when executed by a computing device, causes the computing device to perform operations including: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and when the event or evacuation order occurs and based on the payment for the evacuation service offering, automatically initiating a payment to a user account.

In some aspects, the techniques described herein relate to a system for implementing an evacuation process, the system including: at least one processor; and a computer-readable storage medium storing instructions which, when executed by the at least one processor, cause the at least one processor to perform operations including: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and when the event or evacuation order occurs and based on the payment for the evacuation service offering, automatically initiating a payment to a user account.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology generally relate to systems and methods for implementing an evacuation prediction and management engine. This is a computer implemented process via a computer module or via computer code executed on a computing device which performs the various operations related to modeling processes, triggering processes, loss modeling and prediction processes, as well as modeling of services that can be offered when a triggering event occurs and what steps occur when an event causes or requires an evacuation or some other actions.

What is needed in the art is a new solution to help with short-term climate or other disaster-related risk. Because evacuation events can vary so dramatically (e.g., such event can include fire, a hurricane, an earthquake a gas-leak, war conditions, a flood condition, a drought condition, etc.) a trigger of such an event can also vary. In generally, a triggering event would initiate the short-term evacuation policy or offering disclosed herein. A triggering event could be a threshold cost of water which has become too expensive due to drought, an amount of snowfall during a snow season, or a level of water accessibility. The triggering event could be a heat wave for a predetermined period of time. Weather conditions such as hurricane data can indicate a high probability of a hurricane of sufficient force hitting land at a particular location, which could trigger the benefits and processes disclosed herein.

One example embodiment disclosed herein relates to evacuation procedures and services. However, also discussed are other services which can relate to events which may still be problematic or challenging but that do not require evacuation.

The overall processed disclosed is a method for predicting and managing evacuations or other event related services. The method can include obtaining data associated with an event such as a hurricane or other event that might require evacuation and processing the data via an evacuation prediction and management engine to obtain an evacuation prediction. When the evacuation prediction indicates that an evacuation order is likely to be issued within a period of time based on the event occurring, the method can include transmitting, via the evacuation prediction and management engine, an evacuation service offering to a user device. Upon a user of the user device confirming acceptance of the evacuation service offering, the method can include receiving a payment for the user for the evacuation service offering. When the event occurs and based on the payment for the evacuation service offering, the method includes automatically initiating a payment to a user account. In order to implement the processes related to predicting and managing evacuations, the disclosed concepts are provided herein.

Figure 1:
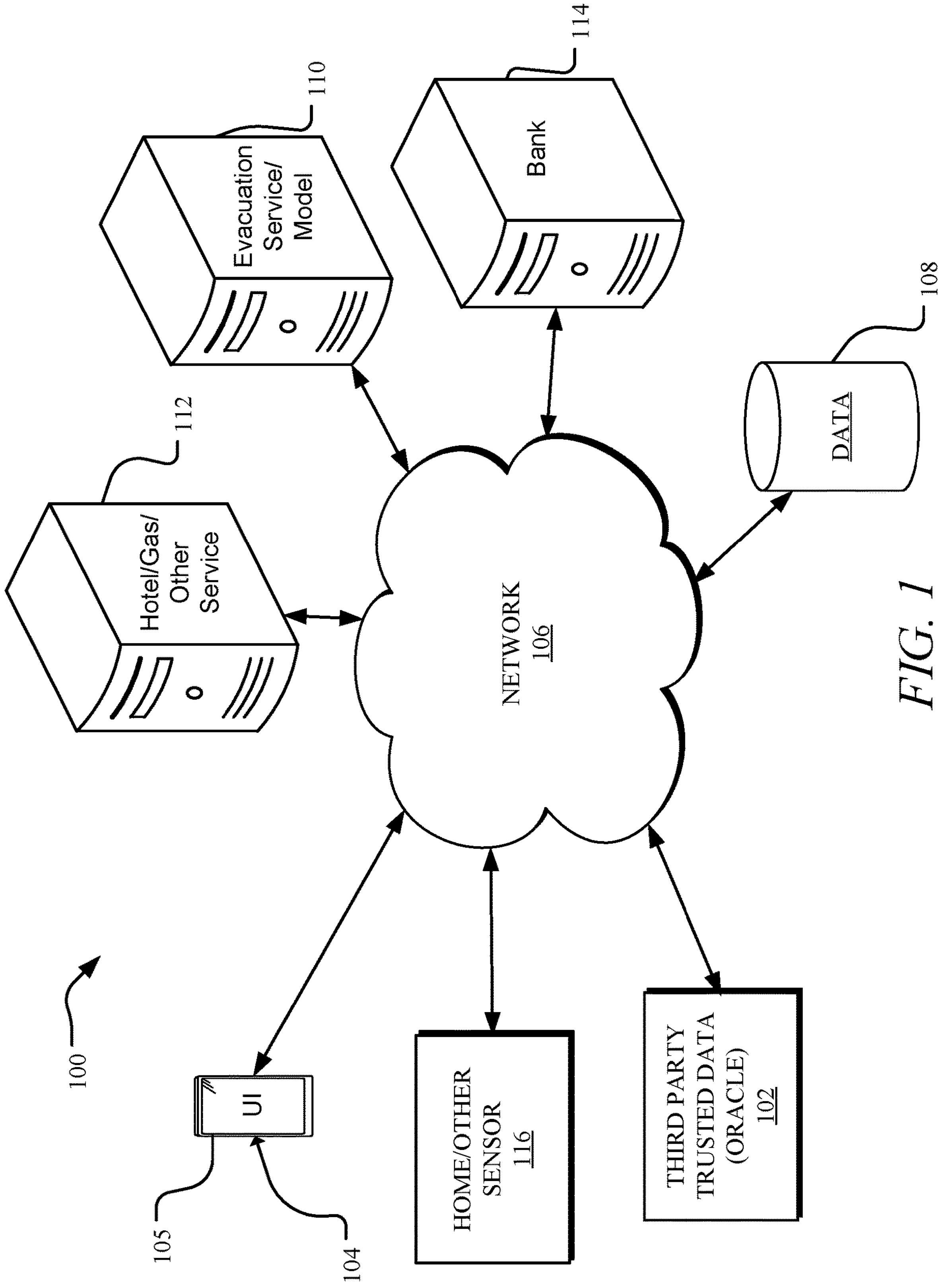
FIG. 1 illustrates an example environment for predicting and managing evacuation from an area for a particular user.

To begin a detailed description of an example environment 100 for implementing the evacuation prediction and management engine, reference is made to FIG. 1. In one implementation, the example environment 100 includes various components such as a third party trusted data source or "oracle" 102. This data source can be, for example, such sources of data as climate data, political data, news reports, seismic data, historical data, population data, intelligence reports, government data, and so forth. A user device 104 is included which can represent the user's individual device upon which a user interface 105 via a browser or an application. A network 106 can represent the Internet, a wireless network, a BlueTooth® or WiFi® network, satellite network, or a combination of different types of networks. Data 108 can represent user data, confidential private data that is encrypted, or other types of data that might be utilized by the evacuation prediction and management engine which can be operative on a server or model 110. Other components that can be part of an overall ecosystem include a hotel/gas or other server 112 that can represent a computing system associated with some service needed by a user as part of an evacuation or some other service. A bank 114 can also be represented for receiving a payment for the user. The evacuation prediction and management engine operative on the server or model 110 can interact with these various components via the network 106.

The server or model 110 can offer modularity to the user. The user device 104 can have an application or a user interface 105 with a shopping approach in which modulatory on the event service can be presented. In this regard, the offering can be a parametric offering because it can be adjusted to the user's parameters as they desire. The user can choose pricing (in real time), event thresholds (e.g., number of heat days, temperate values, snowfall values, river flow values, predictions, fire data, hurricane data, etc.) to tailor their own triggering conditions and see in real time premium adjustments. In other words, users can set the triggering points. In some cases, the offerings to be chosen can also be tailored towards individual users. This can be based on a user's location (e.g., they live on the water rather than inland and are thus at more risk), family circumstance, existing capabilities (e.g., the user has a 4-wheel drive vehicle already or they already have camping gear or an air conditioner or generator), or other factors.

The user interface 105 as an example could offer a sliding bar that the user can interact with to adjust the price, for example, of a service offering in case of a triggering event like a hurricane or a fire. Different risk models and pricing models 110 operate in the background and as the user adjust the price of a service offering, the data or the group of services offered can adjust, as well as a timing of the offering. For example, the user may slide a scale or enter in a price of $500. For that price, the user may be able to lock in services when a probability of a hurricane landing or moving over their home hits 45% or within at least 24 hours of landfall of the hurricane and can include an immediate payment of money into their account, and an automatic reservation of a hotel for 1 week at a safe location 50 miles away. For an extra $100, the services might include traffic routing and automatic downloads of entertainment to their device and automatic communication of their status with a group of people pre-stored in a user profile that will want to follow their location and progress.

In other words, a parametric approach enables users to define their own triggers, pricing and in what the structure of the event service will be. Some users may desire a vehicle to rent and hotel rooms reserved for them. Another family may desire a package of camping gear and food and a reservation at a campsite in a safe location for two weeks. In another case, a user may request an AC unit and a water maker in case of heat or a drought. Users can define both the trigger point and the services provided through a modular or parametric service offering.

Note that in the service offering disclosed herein, the benefit is not just a payout or reimbursement as normally might occur with insurance. The user can in a parametric way determine that their benefit or service when the triggering event occurs might be to have a window AC unit installed, or a car delivered to their home as a rental for two weeks, or a hotel voucher or reservation at a resort or hotel or restaurant. The parameters are customizable by the user for one or both of the triggering event and the services implemented when the triggering event occurs. The model 110 can include as part of how the selections are offered to the user a pricing model which relates to the probability of loss as well as part of the model. When the triggering event relates to climate, the model 110 can leverage climate data 102 to determine the probability of the event happening.

In one aspect, the system 100 can include a home or other sensor 116 that can be connected to the network 106 and which can provide data to the server or model 110. In this case, for example, data regarding smoke or fire (if the sensor 116 is a smoke or fire alarm) can be received as a triggering event. The user may have purchased a service offering in which if the air quality at the home drops to a certain threshold, then the service offering provides an air purifier to be delivered. Satellite images may determine that smoke from a forest fire is covering a certain area and those with the service offering purchased can have air purifiers delivered. Such satellite data can be considered as coming from the oracle 102. A parametric offering in this regard can include the ability for a user to select a triggering event (e.g., smoke in the home, smoke in the town to a certain threshold, a fire in the forest behind their home, etc.) and then select the service offering which can include the delivery of an air purifier, booking a hotel for three days in a neighboring town, paying an initial immediate amount of money to help with an evacuation, and so forth. With respect to air quality, the server or model 110 can also be trained on such factors in which air quality data is provided and predictions and a probability of the event occur and the potential losses from reduced air quality can be part of the model 110.

Figure 2:
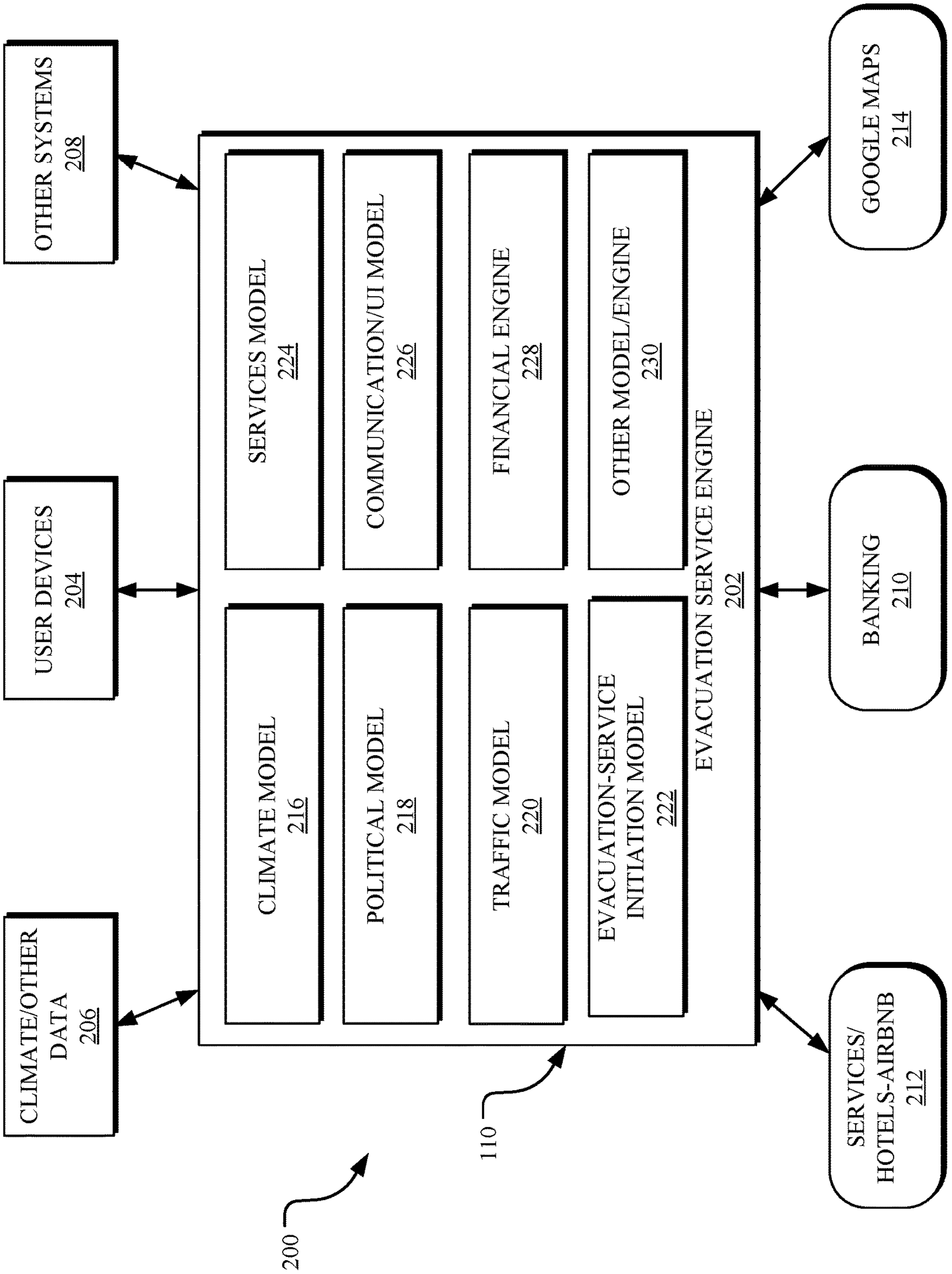
FIG. 2 is an example evacuation service engine for predicting and managing evacuations for a particular user.

FIG. 2 illustrates an example ecosystem 200 which can include a server 110 having the evacuation prediction and management engine 202. Included within the engine 202 can be one or more artificial intelligence or machine learning models. There are many different types of machine learning models and any model can be included which is trained on data and which then receives new data and makes a classification or prediction based on the data. The models may also include combinations of two or more models.

A machine learning model is a program that can find patterns or make decisions from a previously unseen dataset. For example, in natural language processing, machine learning models can parse and correctly recognize the intent behind previously unheard sentences or combinations of words. In image recognition, a machine learning model can be taught to recognize objects—such as cars or dogs. A machine learning model can perform such tasks by having it 'trained' with a large dataset. In this case related to this disclosure, the dataset can relate to weather conditions, hurricane events, loss probabilities of what damages might need to be reimbursed after a loss, other conditions related to fire, earthquake, droughts, wars, protests, politics, etc., and the predicted or probable loss that can flow from such events. During training, the machine learning algorithm is optimized to find certain patterns or outputs from the dataset, depending on the task. The output of this process—often a computer program with specific rules and data structures—is called a machine learning model. A machine learning algorithm is a mathematical method to find patterns in a set of data. Machine Learning algorithms are often drawn from statistics, calculus, and linear algebra. Some known examples of machine learning algorithms include linear regression, decision trees, random forest, and XGBoost. The process of running a machine learning algorithm on a dataset (called training data) and optimizing the algorithm to find certain patterns or outputs is called model training. The resulting function with rules and data structures is called the trained machine learning model. In general, most machine learning techniques can be classified into supervised learning, unsupervised learning, and reinforcement learning. The particular structure of a machine learning or artificial intelligence model as used herein is flexible.

Deep learning models are a class of machine learning models that imitate the way humans process information. The model consists of several layers of processing (hence the term 'deep') to extract high-level features from the data provided. Each processing layer passes on a more abstract representation of the data to the next layer, with the final layer providing a more human-like insight. Unlike traditional machine learning models which require data to be labeled, deep learning models can ingest large amounts of unstructured data. They are used to perform more human-like functions such as facial recognition and natural language processing. In some cases, deep learning models can also be implemented as the probability model described herein.

Any type of model as would be known to those of skill in the art can be implemented to generate the probability models related to generating an output which predicts a probability of an event occurring and can predict the loss associated with that event. From the outputs of such models, pricing and parametric and modular service offerings can be selected by users.

The prediction in this case relates to an event occurring typically related to climate and/or an evacuation order from the government related to the event. The engine 202 can include other components as well. For example, a climate model 216 might receive data from a climate data source 206. The climate model can process the data and provide a prediction of a climate event and when/where the event might occur, such as a hurricane, tornadoes, droughts, or other climate events. A political model 218 can receive political data from news sources and make predictions about the likelihood of an evacuation order. For example, one particular political party might be much more likely to issue an evacuation over another party. The political differences can impact whether an order is issued and/or when it is issued. Note that in many cases political data can be spun by different sources of news and in this case, the political model 218 may evaluate news from different sources to determine the accuracy of any information. In one example, the smart contract 602 shown in FIG. 6 can function to determine via a consensus algorithm whether a certain fact has been reported consistently across different leaning news sources to confirm its accuracy and record such data on a blockchain network 604.

In one example, the model 110 may be trained on such data as drought data, water levels, heat levels and so forth. Based on triggering events and other data, the models can determine or predict the costs for various modularized services. Data can include one or more of characteristics of homes or cities and populations in the potentially problematic region, what are the losses expected and the costs of policies that should be incurred, what services should or could be provided or what indemnity product should be provided to users after the triggers, how many people will purchase the policies, and so forth. Further, the model 110 can also determine pricing and the timing of pricing relative to the timing of the event actually occurring and the probability of the event occurring. The model 110 can predict a maximum probability loss and determine event services based on the probability loss. That probability, such as in the case of a hurricane, changes moment by moment based on the computer models and predictions and thus the costs of such a policy and the services offered can be dynamically changing as well.

A traffic model 220 might include data about traffic patterns that could be used by the evacuation prediction and management engine 202 to guide evacuees onto different roads and to different destinations to reduce traffic jams. An evacuation-service initiation model 222 could be used to determine when the service engine should initiate its services and at what scope. For example, the evacuation-service initiation model 222 might analyze the geography of a population and compare the data from a climate model 216 to determine which regions to cause an evacuation to be initiated. The evacuation-service initiation model 222 might also determine how to distribute evacuees into different safe regions so one road is not clogged with all the evacuees.

A services model 224 can include such data as hotels, schools, hospitals, restaurants, drug stores, grocery stores, camping gear stores, and so forth. Any service that might be useful in an evacuation. For example, a service might use information from the other models to determine that 4 cities outside a hurricane region are going to be flooded with evacuees and may cause notices to go to hotels, restaurants, and grocery stores to expect an increase in population within 30 hours. Supplies may be rushed into these services to prepare for the people in advance. Communicating with such service systems can be represented by the hotels/services and airBnB® component 212 that might receive orders or requests for bookings from the evacuation prediction and management engine 202. Where a payment needs to be made, a banking component 210 can receive an instruction to transfer money to an evacuee's bank account immediately to help them in the evacuation. The evacuation prediction and management engine 202 may coordinate with other services such as Google Maps 214 or companies with driving applications like Waze® or other navigation tools. The evacuation prediction and management engine 202 may use a communication/UI model 226 which can generate user interface 105 and provide such interfaces to user devices 204 to simplify and enable users to interact with the system to customize the services or make decisions in an easy manner.

For example, if an evacuation is ordered, the communication/UI model 226 may instruct a user via their user device 204 that they need to evacuate and that $500 has been deposited into their bank account or a credit has been provided to their credit card so that they can jump in the car and go. The user interface 105 may ask "are you going to travel south to your mother's or north to your cousin's house or do you need a hotel?" A selectable object might be presented in which the user with one-click can provide instructions about what they want to do. If they want a hotel, the evacuation prediction and management engine 202 can coordinate with a hotel component 212 and book a hotel and send the user a route to get the hotel. The evacuation prediction and management engine 202 may even directly pay for the hotel as well. Such payments can be managed by a financial engine 228 that can manage interactions with banks 210 or other entities.

Other operations can occur as well, which can be performed by the other model/engine 230. For example, critical user data may be retrieved and provided to the user device 204 automatically in a user "wallet" much like airline tickets or credit cards are held in a user's electronic wallet. Thus, the user can access insurance numbers, social security numbers, driver's license numbers, credit card accounts, other accounts or phone numbers, and a group of individuals to contact or keep apprised of the user's location and status. Such data can be held in a secure database and provided to the user as part of an evacuation plan. For example, the evacuation services can include a check-in every 4 hours in which the user interface 105 presents a selectable object that says "Are you OK, can I report to your family that all is well right now?" with options to say yes, or no or asking them to call. In this manner, again in a stressful situation, the evacuation services can receive easy feedback from the user and report to the contact list in the user profile.

Figure 3:
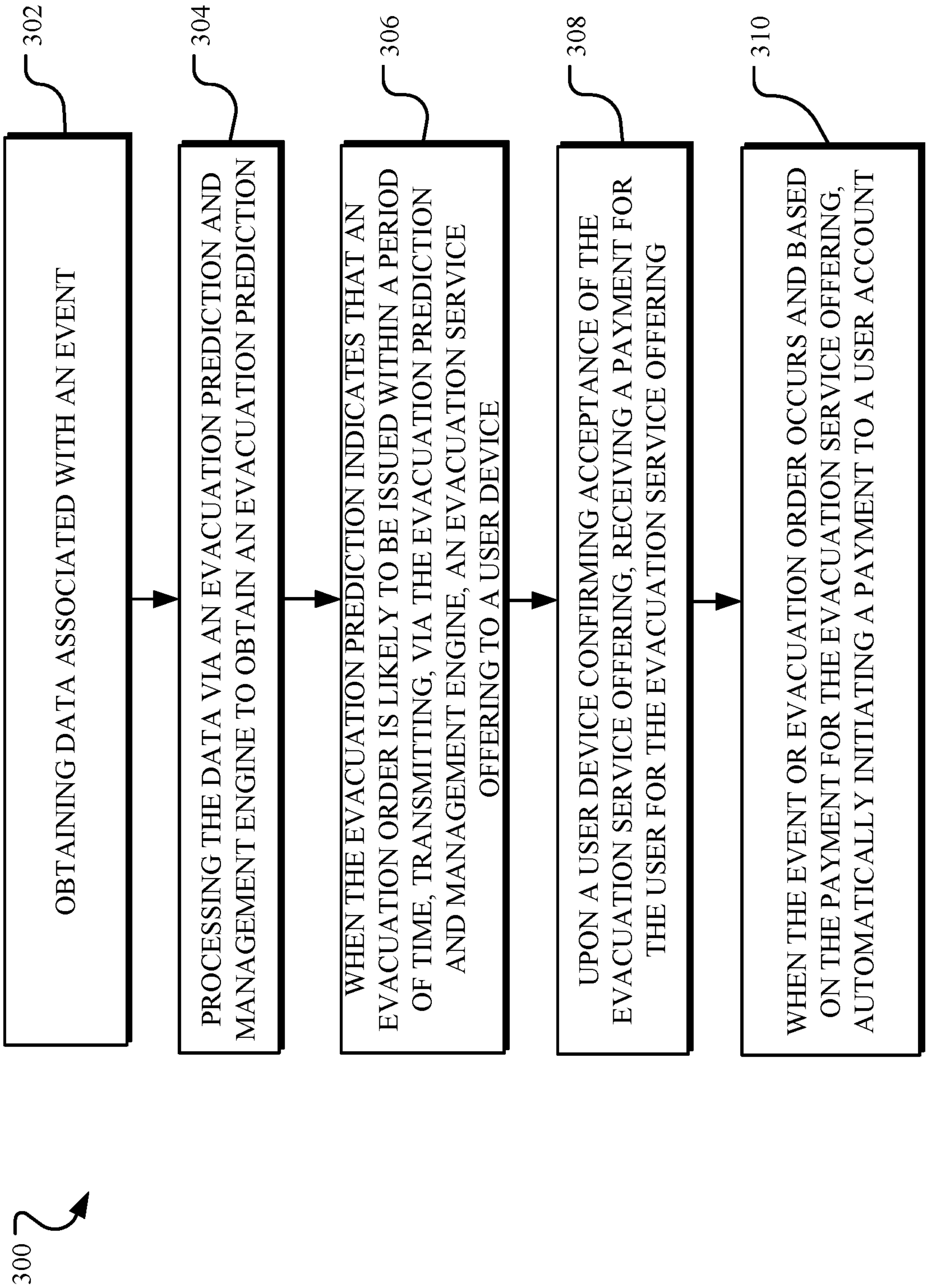
FIG. 3 illustrates example operations for implementing an evacuation prediction and management engine.

FIG. 3 illustrates example operations 300 for predicting and managing an evacuation situation can include obtaining data associated with an event (302) and processing the data via an evacuation prediction and management engine to obtain an evacuation prediction (304). When the evacuation prediction indicates that an evacuation order is likely to be issued within a period of time based on the event occurring, the method includes transmitting, via the evacuation prediction and management engine, an evacuation service offering to a user device (306). Upon a user of the user device confirming acceptance of the evacuation service offering, the method includes receiving a payment for the user for the evacuation service offering (308) and, when the event or evacuation order occurs and based on the payment for the evacuation service offering, the method includes automatically initiating a payment to a user account (310). The data is received from a third-party oracle. The oracle can provide third party accurate data from a third-party source related to any topic like weather or politics or business, etc. The data can be confirmed to be accurate via recordation on a blockchain network.

The evacuation service offering can be structured based at least in part on one or more of a loss modeling, a probability of the event actually occurring, a location of the user, how many users have purchased the evacuation service offering, availability of services, whether the user has existing insurance, a predetermined destination for the user, user modular selections from a service offering, and whether the user has accepted a request to participate in other supportive services. The service offering can also be modeled basted on the loss model and performance modeling. For example, the model both relates to the probability of the event but also a model of the needed services for the type of user. For example, a family with 4 young children may need a very different set of services than a single person with no children. Choices related to the service offering can be made by the user upon accepting the evacuation service offering.

The evacuation prediction and management engine 110 can predict, based on at least climate data and political data, whether the evacuation order is likely to be issued. The evacuation order might be a government order or it might also be a suggestion or recommendation for people to evacuate. Depending on what is expected from a government entity, there may be different models for the service needs of the community. An evacuation order can cover a certain area and include other instructions such as suggested or required destinations for people to go. The evacuation prediction and management engine 110 can predict, based on at least political data and other event-related data, whether the evacuation order is likely to be issued. In this regard, there may be a threshold value such as 50% or 60% probability of an order being issued that can be the result of the prediction. The prediction might include timing. For example, the political leadership in a hurricane region might have a tendency to call for an evacuation order early when a hurricane is getting close to shore. The cone of the possible path of the hurricane is one piece of data that can be coordinated with political tendencies to predict whether and when an order may be received.

The other event-related data can be associated with one or more of an earthquake, a fire, smoke, a pandemic, a weather-event, or political unrest. The evacuation service offering can be customizable for the user with respect to one or more of cost, a set of evacuation services offered, a location of the user, a destination of the user in case of evacuation, a need for automatic booking of a hotel, a need for food services, and so forth. A user interface 105 on a browser or application can help a user navigate through such offerings and enable them to tailor the offering to their own desires and cost.

When the event occurs and/or when the evacuation order issues and based on the payment for the evacuation service offering, the method further can include one or more steps of: accessing critical data associated with the user; automatically booking a hotel for the user; and receiving input from the user associated with the evacuation service offering and tailoring, based on the input, a service of the evacuation service offering. The initiation of the evacuation offering can include these and other steps that can help make life easier for the user. In one example, a user interface 105 of an application or of a mobile device may be changed and/or simplified to focus on the needed services such as maps and payment methods. Other applications in the user interface 105 may be shifted to the background or temporarily removed as they are likely not going to be used in an emergency. An evacuation application may also have its user interface 105 adjusted once the services are initiated to make the choices easier for the user during a stressful time.

Figure 6:
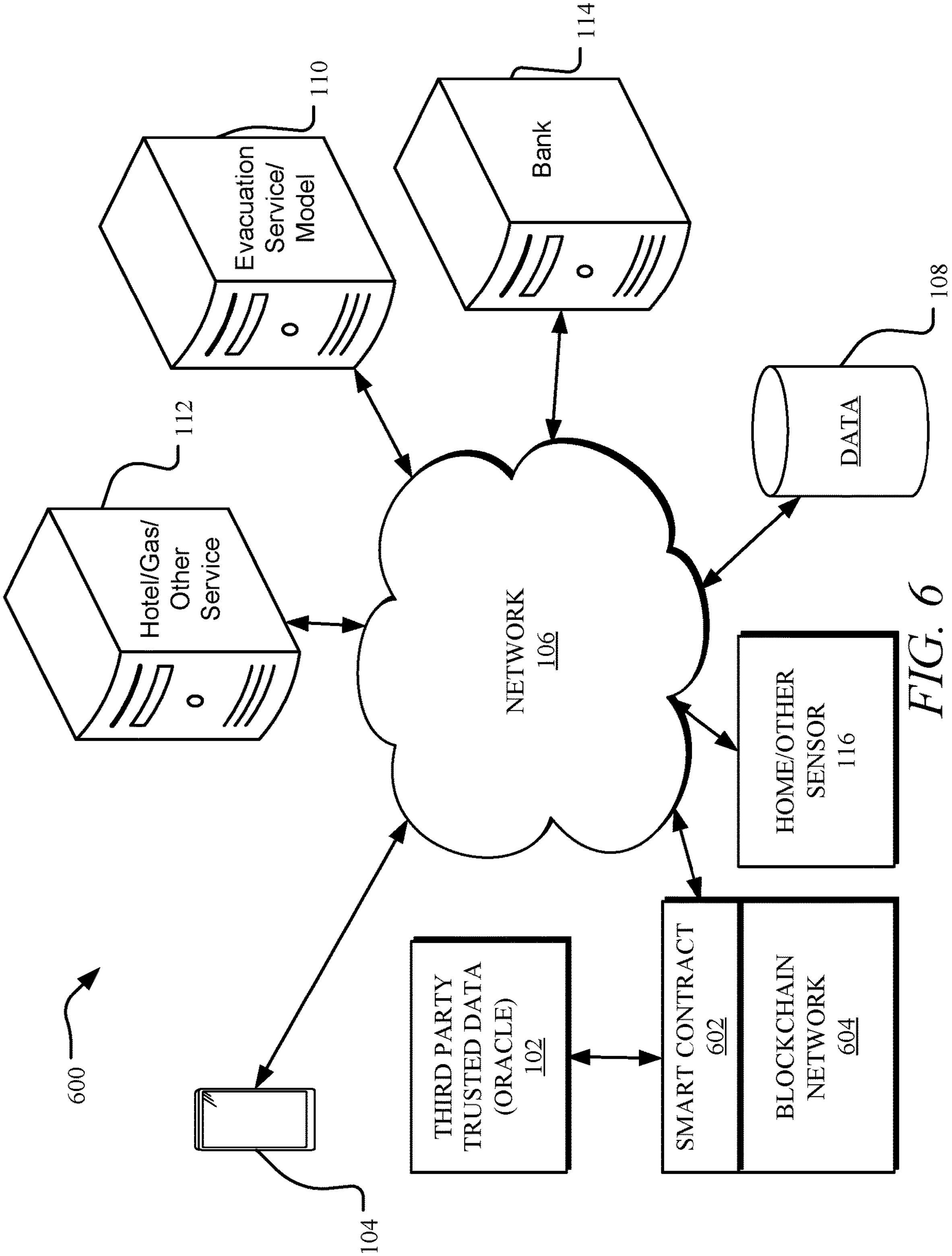
FIG. 6 shows an example network environment including a blockchain network that may implement various systems and methods discussed herein.

As noted above, the method can in one aspect be performed by a smart contract operating on a blockchain network as shown in FIG. 6. In this manner, tasks or facts that are relied upon to initiate the service offering can be confirmed via a smart contract on a blockchain network. This can help to prevent fraud in the use of the offerings. The blockchain network includes a plurality of computer nodes each operating an instance of a consensus algorithm and an instance of a distributed ledger. The method further can include automatically initiating a payment to a user account occurs only after the smart contract confirms the event and a transaction is recorded on the distributed ledger after confirmation of the consensus algorithm.

Then method can also include performing a confirmation, via an interaction of the user with the user device, of one or more of a new location of the user and purchases associated with the evacuation service offering.

In one aspect, the evacuation prediction and management engine 110 can coordinate with one or more of a hotel booking service 212, a car rental services 212, a food industry service 212, a map service 214, an airline service 212, a personal home booking service 212, banking services 210, communication services 212, and/or emergency services 212. The method can further include confirming, by the evacuation prediction and management engine 110, that the user does not already have insurance coverage for an evacuation. When the user has insurance covers associated with an evacuation, the payment to a user account can be treated as a loan to be repaid by an insurance company that issued the insurance. The evacuation prediction and management engine 110 can coordinate with a communication service and ensures that the user has data bandwidth during the evacuation. The engine 110 may coordinate with data plans for users at companies such as Apple or AT&T to adjustments to the data plan given the service offering.

The method further can include, when the event occurs and based on the payment for the evacuation service offering, transmitting an evacuation route to the user device to guide the user to a destination. The route can be determined on an individual basis. The evacuation prediction and management engine 110 can distribute users across different routes and to different destinations during an evacuation to reduce traffic issues.

An example embodiment can include a tangible non-transitory computer-readable storage media that stores computer-executable instructions which, when executed by a computing device, causes the computing device to perform operations including: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and, when the event or evacuation order occurs and based on the payment for the evacuation service offering, automatically initiating a payment to a user account.

In another embodiment, a system for implementing an evacuation process includes: at least one processor; and a computer-readable storage medium storing instructions which, when executed by the at least one processor, cause the at least one processor to perform operations including: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and, when the event or evacuation order occurs and based on the payment for the evacuation service offering, automatically initiating a payment to a user account.

Notably, while the methods and operations above describe transmitting an offer to the user based on the prediction from the evacuation prediction and management engine 110, in other aspects, a user may be able to purchase the service well in advance of any predictions or pending event. Thus, the timing of the user signing up and paying for the evacuation services can be well in advance or based on predictions of an impending evacuation event. As the event gets closer and the likelihood of the event happening increases, the cost of the evacuation services will also increase.

Figure 4:
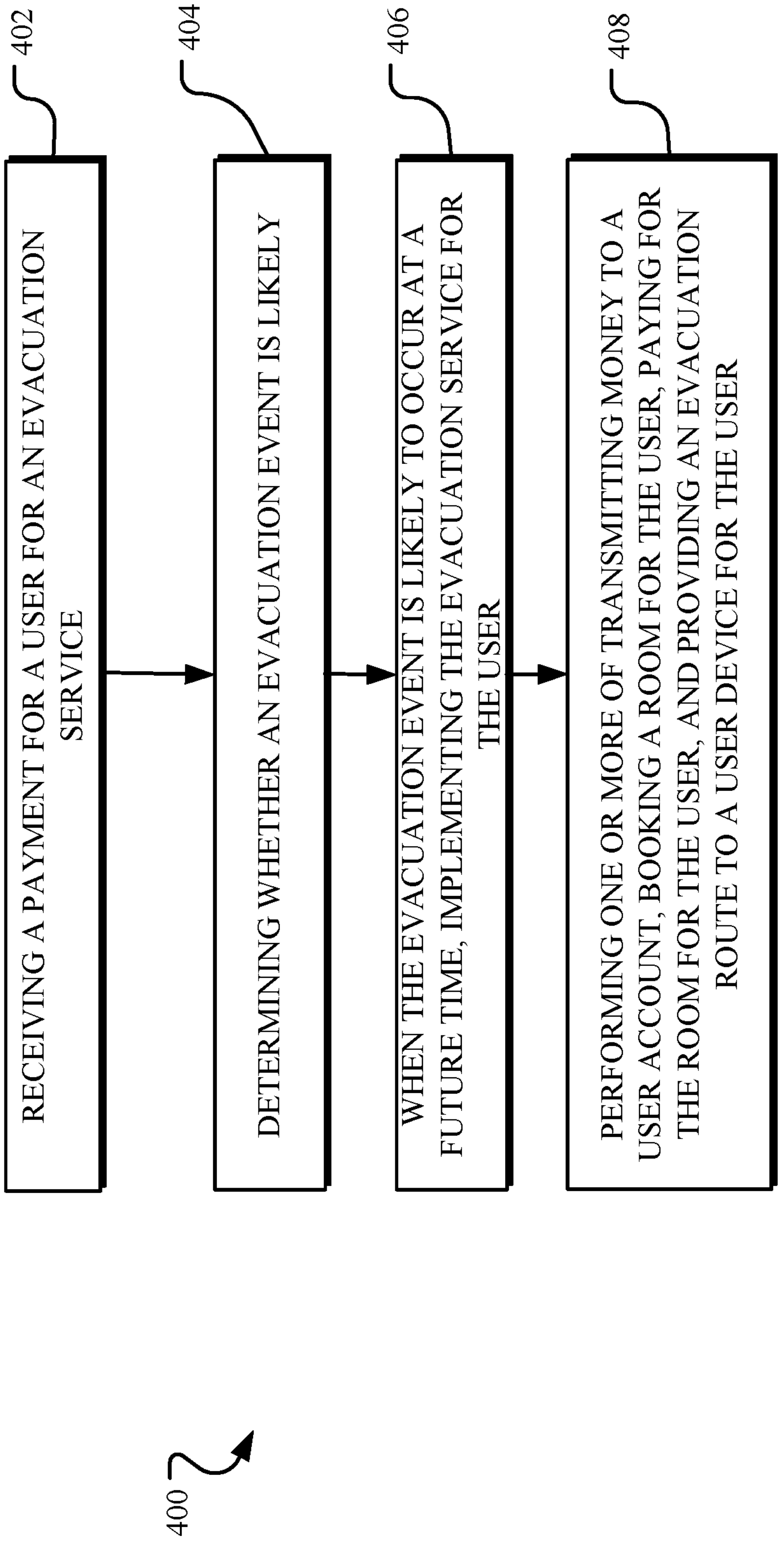
FIG. 4 illustrates other example operations for implementing an evacuation prediction and management engine.

FIG. 4 illustrates example operations 400 for providing an evacuation service. In this example, it is assumed that the user has paid in advance for the evacuation service prior to a prediction of a specific evacuation event. Alternatively, if the event is predicted to happen, the operations in FIG. 4 occur after the user has registered or paid for the evacuation services. The operations 400 can include receiving a payment from a user for an evacuation service (402), determining whether an evacuation event is likely (404), when the evacuation event is likely to occur at a future time, implementing the evacuation service for the user (406), performing one or more of transmitting money to a user account, booking a room for the user, paying for the room for the user, providing an evacuation route to a user device for the user (408). In one aspect, the operations 400 can be performed by an evacuation prediction and management engine 110. In this regard, the user in advance purchases the service and then when the evacuation event is likely or an evacuation order is likely and then occurs, then the evacuation service is initiated and the user starts to get aspects of the service like a quick payment, or an evacuation plan and/or route, rooms booked, a car rented, or any other aspect of helping the user evacuate to a new area.

In another embodiment, a system for implementing an evacuation process includes: at least one processor; and a computer-readable storage medium storing instructions which, when executed by the at least one processor, cause the at least one processor to perform operations including: receiving a payment from a user for an evacuation service, determining whether an evacuation event is likely, when the evacuation event is likely to occur at a future time, implementing the evacuation service for the user, performing one or more of transmitting money to a user account, booking a room for the user, paying for the room for the user, providing an evacuation route to a user device for the user.

Figure 5:
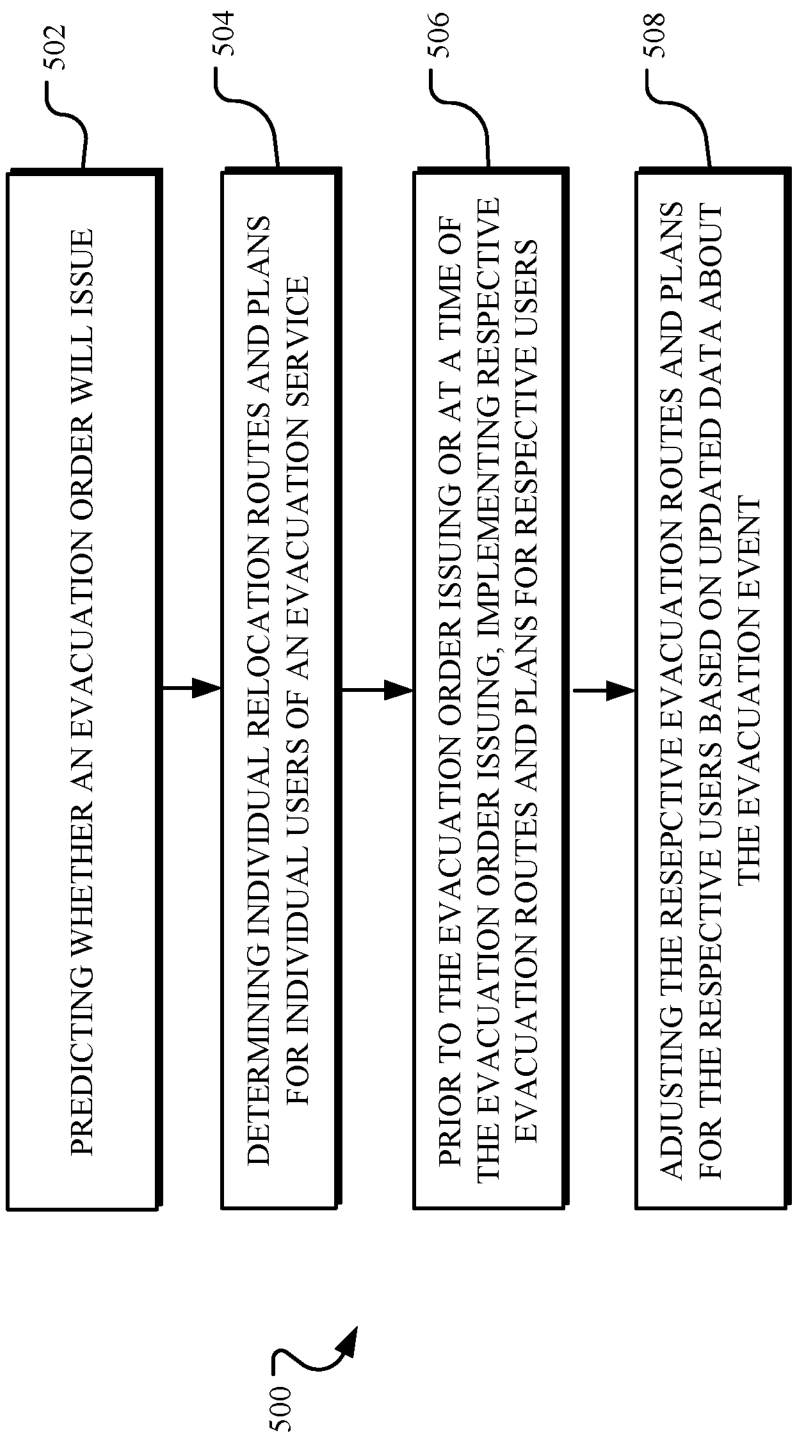
FIG. 5 illustrates another example set of operations for predicting and managing an evacuation.

FIG. 5 illustrates other example operations 500 for managing evacuations. In one implementation, the operations 500 include predicting whether an evacuation order will issue (502), determining individual relocation routes and plans for individual users who have purchased an evacuation service (504), prior to the evacuation order issuing or at a time of the evacuation order issuing, implementing respective evacuation routes and plans for respective users that take into account one or more of individual modifications to the evacuation service, traffic control during an evacuation, distributing users to different areas where rooms are available during the evacuation, instructing food and other services to prepare for evacuees, and providing money to users who have purchased the evacuation service (506). The operations can further include adjusting the respective evacuation routes and plans for the respective users based on updated data about the evacuation event (508). For example, a hurricane may weaken or change paths. Some users may be told to go home while others may have hotel rooms changes and instructions to go to a different town. As an evacuation event can be dynamically changing which can cause some evacuation plans to need to be changed, the evacuation service includes updates which may change the instructions or the service offerings based on current data.

In another embodiment, a system for implementing an evacuation process includes: at least one processor; and a computer-readable storage medium storing instructions which, when executed by the at least one processor, cause the at least one processor to perform operations including: predicting whether an evacuation order will issue; determining individual relocation routes and plans for individual users who have purchased an evacuation service; prior to the evacuation order issuing or at a time of the evacuation order issuing, implementing respective evacuation routes and plans for respective users that take into account one or more of individual modifications to the evacuation service, traffic control during an evacuation, distributing users to different areas where rooms are available during the evacuation, instructing food and other services to prepare for evacuees, and providing money to users who have purchased the evacuation service; and adjusting the respective evacuation routes and plans for the respective users based on updated data about the evacuation event.

FIG. 6 illustrates an example network environment 600 that is similar to FIG. 1 with the addition of a smart contract 602 that operates on a blockchain network 604. The block chain network records data immutably through the use of a distributed set of nodes that are physically separate and that each operate an instance of a consensus algorithm that must agree according to the consensus terms whether to record a transaction or data. The recordation of the data is on a distributed ledger across the nodes. Each node has a copy of the distributed ledger. In this manner, only data in the block of the blockchain network 604 can be recorded after the consensus and one cannot simply go in and change the data. The blockchain network 604 can be used to confirm or utilize data that has confidence such as data form an oracle 102 that is a third party that is trusted. The oracle may also utilize a blockchain network 604 to confirm that the data is provides is agreed upon by a consensus algorithm. Data that is recorded on a distributed ledger of a blockchain network 604 has changed “states” in that it cannot any longer be easy to change or delete from a regular database. In a normal database, any person with access can delete or copy or change the data. However, a block in a blockchain network 604 is recorded using a hash of the previous block and that data cannot be changed without the consensus of the distributed consensus algorithm. Thus, no person can simply go in and change the data in the database. Its state has changed to being an immutable recording of a transaction or data. In this regard, the use of a blockchain network 604 differs from simply storing data on a generic computer with a generic memory.

As noted above, other event-related services can be provided independent of evacuation services. For example, if the triggering event is a drought our an increased in costs of water, the system may provide reimbursement to a policy owner to keep water costs down or the service may be to provide short term access to water or a water generator. In the scenario of a heat wave, a trigger might be hit which would provide to the user or policy holder air conditioning (AC) access or a split AC unit. In other words, a user who has purchased such a policy may receive an AC unit rather than reimbursement for costs. The approach can enable a hedge around keeping utility costs low.

Climate or environmental risks can exist where many people have no insurance coverage for individual consumers. Some markets provide some coverage but there is no consumer application or ability to protect against such risk. One approach disclosed herein is to make such an event offering available to consumers to help in unique ways for people to handle short term risk or to provide for short terms needs independent of a reimbursement model.

In one example, a machine learning model or artificial intelligence model can be represented by the model 110 shown in FIG. 1. An oracle 102 can provide data related to the topic of the protection such as weather data, flooding data, snowfall data, war data, and so forth. The model 110 can be trained based on the event parameters and past history of a probability of the event happening and a model of the losses that can flow from the event happening. Based on that modeling and a classification or output data from such a model 110, an event service offering can be provided or offered to users at a certain price point. Users through user devices 104 can be presented via a user interface 105 with data regarding the service offering and can be presented with the ability to tailor the offering to their own needs. Some users might desire the installation of a water generator or might desire an AC unit installed if the triggering event occurs.

Some users might be able to set a time frame with respect to when they would purchase the service offering. For example, some users may desire to purchase the service offering through a user interface 105 on their user device 104 when the probability of the event hits 70% within a certain period of time like 1 month.

In this regard, consider an evacuation event like a hurricane. The news always starts to track the hurricane far offshore and the models start to make predictions on where it will hit land and at what strength. The user could purchase an evacuation service early for a cheaper price or may be able to see a modeling/pricing structure for how much the price would increase as or if the model predicts a higher probability of the evacuation event hitting their home's location. The user could request an automatic purchase of the evacuation service if the model prediction hits 80% or whatever threshold the user selects, which can whether the user's home is in the 90% prediction cone of movement of the hurricane plus a hurricane rating above a threshold like a 2 or 3. In this case, the user can manage the costs of the evacuation service and their risk tolerance. If the conditions set by the user are met by data received from the oracle 102 and the model or the evacuation prediction and management engine 110, then the user is automatically charged for the evacuation service, a payment is transferred to a service provider, and the necessary evacuation services can begin to be made available to the user such as a transfer of money, travel plans, hotel reservations, etc. In one example, a user may request a "camping" package in which a package of food, an outdoor cooking stove, tent, and other supplies are delivered as a package that they can put in their car and leave. Other service offerings may include the user requesting two weeks of a hotel stay north or south of the danger zone and restaurant reservations for each night in that town.

In another aspect, the evacuation offerings can include accessing communication data for the user such as contact information for parents, friends and loved ones. The evacuation service 110 can manage notifications to those on the contact list such that they can receive notices of a user's location and even scheduled or prearranged video conference calls or audio calls to communicate the user's status.

If the person buying the evacuation service has children, the service can include children's offerings. Many families have for example an Apple account where all the family devices are included in the same plan. The evacuation model can coordinate (with approval) with Apple or some other service provider which may know ages and proclivities of games or videos watched by children. Such entertainment content can be pushed to children's devices within the family plan which can make entertaining children much easier in a stressful time. Downloaded content or games can be automatically provided and reported a parent device so that that know there is hours of content available for a long drive. Furthermore, the content can be tailored to be age appropriate and/or psychologically to be more calming and comforting as well.

Figure 7:
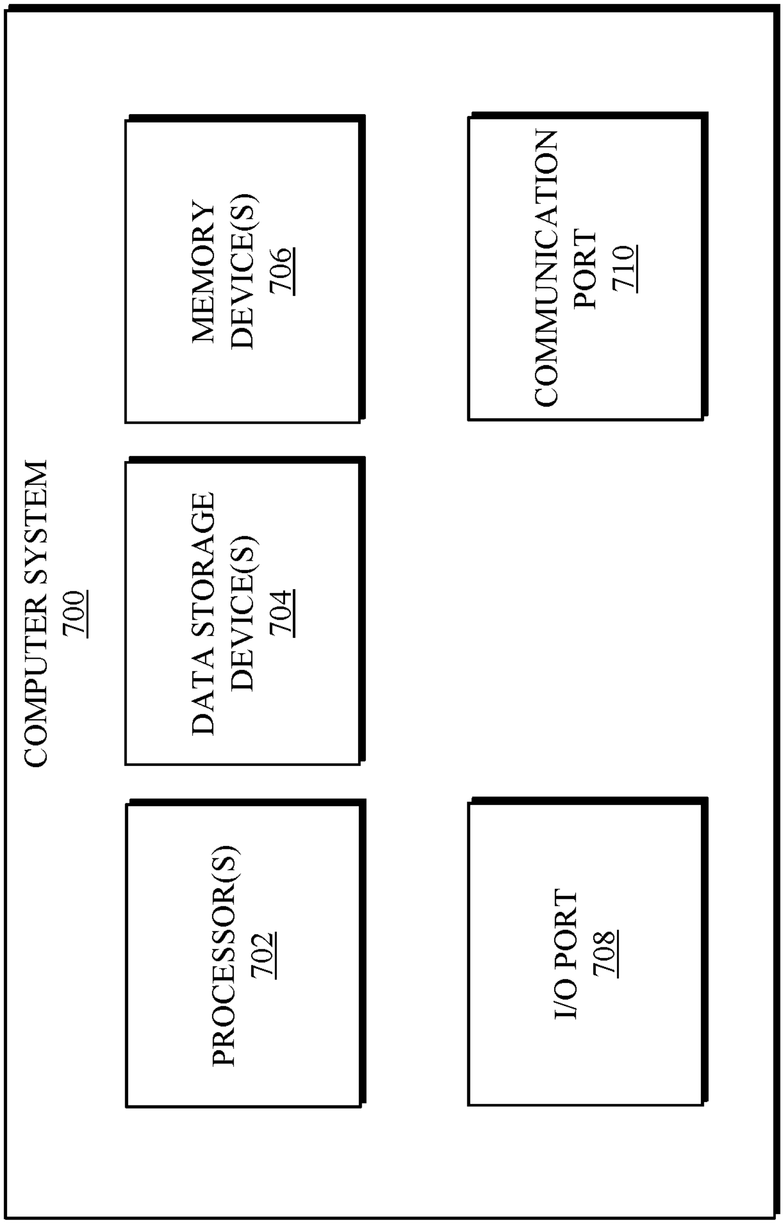
FIG. 7 is an example computing system that may implement various systems and methods discussed herein.

Referring to FIG. 7, a detailed description of an example computing system 700 having one or more computing units that may implement various systems and methods discussed herein is provided. The computing system 700 may be applicable to the telematics device 104, the mobile device 106, the provider system 108, the privacy control system 110, the privacy control system 202 (including each of the sub-components and systems), the user device 204, the provider systems 206, the other systems 208, and other computing or network devices. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 708, and/or one or more ports 708-710. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device(s) 706, and/or communicated via one or more of the ports 708-710, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708 and a communication port 710, for communicating with other computing, network, or vehicle devices. It will be appreciated that the ports 708-710 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 710 may communicate with an antenna or other link for electromagnetic signal transmission and/or reception.

In an example implementation, personal data access control software and other modules and services may be embodied by instructions stored on the data storage devices 704 and/or the memory devices 706 and executed by the processor 702.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

In some aspects, clauses of this disclosure can include:

Clause 1. A method for predicting and managing evacuations, the method comprising: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and when the event or evacuation order occurs and based on the payment for the evacuation service offering, automatically initiating a payment to a user account.

Clause 2. The method of clause 1, wherein the data is received from a third-party oracle.

Clause 3. The method of clause 2, wherein the data is confirmed to be accurate via recordation on a blockchain network.

Clause 4. The method of clause 2, wherein the data relates to one or more of climate data or political data.

Clause 5. The method of clause 1, wherein the evacuation service offering is structured based at least in part on one or more of a loss modeling, a probability of the event actually occurring, a location of the user, how many users have purchased the evacuation service offering, availability of services, whether the user has existing insurance, a predetermined destination for the user, user modular selections from a service offering, and whether the user has accepted a request to participate in other supportive services.

Clause 6. The method of clause 1, wherein the evacuation prediction and management engine predicts, based on at least climate data and political data, whether the evacuation order is likely to be issued.

Clause 7. The method of clause 1, wherein the evacuation prediction and management engine predicts, based on at least political data and other event-related data, whether the evacuation order is likely to be issued.

Clause 8. The method of clause 7, wherein the other event-related data is associated with one or more of an earthquake, a fire, smoke, a pandemic, a weather-event, or political unrest.

Clause 9. The method of clause 1, wherein the evacuation service offering is customizable for the user with respect to one or more of cost, a set of evacuation services offered, a location of the user, a destination of the user in case of evacuation, a need for automatic booking of a hotel, a need for food services.

Clause 10. The method of clause 1, wherein when the event occurs and based on the payment for the evacuation service offering, the method further comprises one or more steps of: accessing critical data associated with the user; automatically booking a hotel for the user; and receiving input from the user associated with the evacuation service offering and tailoring, based on the input, a service of the evacuation service offering.

Clause 11. The method of clause 1, wherein the method is performed by a smart contract operating on a blockchain network.

Clause 12. The method of clause 11, wherein the blockchain network comprises a plurality of computer nodes each operating an instance of a consensus algorithm and an instance of a distributed ledger, and wherein the method further comprises: automatically initiating a payment to a user account occurs only after the smart contract confirms the event and a transaction is recorded on the distributed ledger after confirmation of the consensus algorithm.

Clause 13. The method of clause 1, further comprising: confirmation, via an interaction of the user with the user device, of one or more of a new location of the user and purchases associated with the evacuation service offering.

Clause 14. The method of clause 1, wherein the evacuation prediction and management engine coordinates with one or more of a hotel booking service, a car rental services, a food industry service, a map service, an airline service, a personal home booking service, banking services, communication services, and emergency services.

Clause 15. The method of clause 1, further comprising: confirming, by the evacuation prediction and management engine, that the user does not already have insurance coverage for an evacuation.

Clause 16. The method of clause 1, wherein, when the user has insurance covers associated with an evacuation, the payment to a user account is treated as a loan to be repaid by an insurance company that issued the insurance.

Clause 17. The method of clause 1, wherein the evacuation prediction and management engine coordinates with a communication service and ensures that the user has data bandwidth during the evacuation.

Clause 18. The method of clause 1, wherein the method further comprises, when the event occurs and based on the payment for the evacuation service offering, transmitting an evacuation route to the user device to guide the user to a destination.

Clause 19. The method of clause 18, wherein the evacuation prediction and management engine distributes users across different routes and to different destinations during an evacuation to reduce traffic issues.

Clause 20. A tangible non-transitory computer-readable storage media storing computer-executable instructions which, when executed by a computing device, causes the computing device to perform operations comprising: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and when the event or evacuation order occurs and based on the payment for the evacuation service offering, automatically initiating a payment to a user account.

Clause 21. The tangible non-transitory computer-readable storage media of clause 20, wherein the data is received from a third-party oracle.

Clause 22. The tangible non-transitory computer-readable storage media of clause 21, wherein the data is confirmed to be accurate via recordation on a blockchain network.

Clause 23. The tangible non-transitory computer-readable storage media of clause 21, wherein the data relates to one or more of climate data or political data.

Clause 24. The tangible non-transitory computer-readable storage media of clause 20, wherein the evacuation service offering is structured based at least in part on one or more of a loss modeling, a probability of the event actually occurring, a location of the user, how many users have purchased the evacuation service offering, availability of services, whether the user has existing insurance, a predetermined destination for the user, user modular selections from a service offering, and whether the user has accepted a request to participate in other supportive services.

Clause 25. The tangible non-transitory computer-readable storage media of clause 20, wherein the evacuation prediction and management engine predicts, based on at least climate data and political data, whether the evacuation order is likely to be issued.

Clause 26. The tangible non-transitory computer-readable storage media of clause 20, wherein the evacuation prediction and management engine predicts, based on at least political data and other event-related data, whether the evacuation order is likely to be issued.

Clause 27. The tangible non-transitory computer-readable storage media of clause 26, wherein the other event-related data is associated with one or more of an earthquake, a fire, smoke, a pandemic, a weather-event, or political unrest.

Clause 28. The tangible non-transitory computer-readable storage media of clause 20, wherein the evacuation service offering is customizable for the user with respect to one or more of cost, a set of evacuation services offered, a location of the user, a destination of the user in case of evacuation, a need for automatic booking of a hotel, a need for food services.

Clause 29. The tangible non-transitory computer-readable storage media of clause 20, wherein the tangible non-transitory computer-readable storage media stores further instructions which, when executed by the computing device, cause the computing device to perform further operations comprising: when the event occurs and based on the payment for the evacuation service offering: accessing critical data associated with the user; automatically booking a hotel for the user; and receiving input from the user associated with the evacuation service offering and tailoring, based on the input, a service of the evacuation service offering.

Clause 30. The tangible non-transitory computer-readable storage media of clause 20, wherein the operations are performed by a smart contract operating on a blockchain network.

Clause 31. The tangible non-transitory computer-readable storage media of clause 30, wherein the blockchain network comprises a plurality of computer nodes each operating an instance of a consensus algorithm and an instance of a distributed ledger, and wherein the tangible non-transitory computer-readable storage media stores further instructions which, when executed by the computing device, cause the computing device to perform further operations comprising: automatically initiating a payment to a user account occurs only after the smart contract confirms the event and a transaction is recorded on the distributed ledger after confirmation of the consensus algorithm.

Clause 32. The tangible non-transitory computer-readable storage media of clause 20, wherein the tangible non-transitory computer-readable storage media stores further instructions which, when executed by the computing device, cause the computing device to perform further operations comprising: confirmation, via an interaction of the user with the user device, of one or more of a new location of the user and purchases associated with the evacuation service offering.

Clause 33. The tangible non-transitory computer-readable storage media of clause 20, wherein the evacuation prediction and management engine coordinates with one or more of a hotel booking service, a car rental services, a food industry service, a map service, an airline service, a personal home booking service, banking services, communication services, and emergency services.

Clause 34. The tangible non-transitory computer-readable storage media of clause 20, wherein the tangible non-transitory computer-readable storage media stores further instructions which, when executed by the computing device, cause the computing device to perform further operations comprising: confirming, by the evacuation prediction and management engine, that the user does not already have insurance coverage for an evacuation.

Clause 35. The tangible non-transitory computer-readable storage media of clause 20, wherein, when the user has insurance covers associated with an evacuation, the payment to a user account is treated as a loan to be repaid by an insurance company that issued the insurance.

Clause 36. The tangible non-transitory computer-readable storage media of clause 20, wherein the evacuation prediction and management engine coordinates with a communication service and ensures that the user has data bandwidth during the evacuation.

Clause 37. The tangible non-transitory computer-readable storage media of clause 20, wherein the operations further comprise, when the event occurs and based on the payment for the evacuation service offering, transmitting an evacuation route to the user device to guide the user to a destination.

Clause 38. The tangible non-transitory computer-readable storage media of clause 37, wherein the evacuation prediction and management engine distributes users across different routes and to different destinations during an evacuation to reduce traffic issues.

Clause 39. A system for implementing an evacuation process, the system comprising: at least one processor; and a computer-readable storage medium storing instructions which, when executed by the at least one processor, cause the at least one processor to perform operations comprising: obtaining data associated with an event; processing the data via an evacuation prediction and management engine to obtain an evacuation prediction; when the evacuation prediction indicates that an evacuation order is likely to be issued within a period of time based on the event occurring, transmitting, via the evacuation prediction and management engine, an evacuation service offering to a user device; upon a user of the user device confirming acceptance of the evacuation service offering, receiving a payment for the user for the evacuation service offering; and when the event or evacuation order occurs and based on the payment for the evacuation service offering, automatically initiating a payment to a user account.

Clause 40. The system of clause 39, wherein the data is received from a third-party oracle.

Clause 41. The system of clause 40, wherein the data is confirmed to be accurate via recordation on a blockchain network.

Clause 42. The system of clause 40, wherein the data relates to one or more of climate data or political data.

Clause 43. The system of clause 39, wherein the evacuation service offering is structured based at least in part on one or more of a loss modeling, a probability of the event actually occurring, a location of the user, how many users have purchased the evacuation service offering, availability of services, whether the user has existing insurance, a predetermined destination for the user, user modular selections from a service offering, and whether the user has accepted a request to participate in other supportive services.

Clause 44. The system of clause 39, wherein the evacuation prediction and management engine predicts, based on at least climate data and political data, whether the evacuation order is likely to be issued.

Clause 45. The system of clause 39, wherein the evacuation prediction and management engine predicts, based on at least political data and other event-related data, whether the evacuation order is likely to be issued.

Clause 46. The system of clause 45, wherein the other event-related data is associated with one or more of an earthquake, a fire, smoke, a pandemic, a weather-event, or political unrest.

Clause 47. The system of clause 39, wherein the evacuation service offering is customizable for the user with respect to one or more of cost, a set of evacuation services offered, a location of the user, a destination of the user in case of evacuation, a need for automatic booking of a hotel, a need for food services.

Clause 48. The system of clause 39, computer-readable storage medium storing instructions which, when executed by the at least one processor, cause the at least one processor to perform operations comprising: when the event occurs and based on the payment for the evacuation service offering: accessing critical data associated with the user; automatically booking a hotel for the user; and receiving input from the user associated with the evacuation service offering and tailoring, based on the input, a service of the evacuation service offering.

Clause 49. The system of clause 39, wherein the operations are performed by a smart contract operating on a blockchain network.

Clause 50. The system of clause 49, wherein the blockchain network comprises a plurality of computer nodes each operating an instance of a consensus algorithm and an instance of a distributed ledger, and wherein the computer-readable storage medium storing instructions which, when executed by the at least one processor, cause the at least one processor to perform operations comprising: automatically initiating a payment to a user account occurs only after the smart contract confirms the event and a transaction is recorded on the distributed ledger after confirmation of the consensus algorithm.

Clause 51. The system of clause 39, wherein the computer-readable storage medium stores instructions which, when executed by the at least one processor, cause the at least one processor to perform operations comprising: confirmation, via an interaction of the user with the user device, of one or more of a new location of the user and purchases associated with the evacuation service offering.

Clause 52. The system of clause 39, wherein the evacuation prediction and management engine coordinates with one or more of a hotel booking service, a car rental services, a food industry service, a map service, an airline service, a personal home booking service, banking services, communication services, and emergency services.

Clause 53. The system of clause 39, further comprising: confirming, by the evacuation prediction and management engine, that the user does not already have insurance coverage for an evacuation.

Clause 54. The system of clause 39, wherein, when the user has insurance covers associated with an evacuation, the payment to a user account is treated as a loan to be repaid by an insurance company that issued the insurance.

Clause 55. The system of clause 39, wherein the evacuation prediction and management engine coordinates with a communication service and ensures that the user has data bandwidth during the evacuation.

Clause 56. The system of clause 39, wherein the operations further comprise, when the event occurs and based on the payment for the evacuation service offering, transmitting an evacuation route to the user device to guide the user to a destination.

Clause 57. The system of clause 56, wherein the evacuation prediction and management engine distributes users across different routes and to different destinations during an evacuation to reduce traffic issues.

What is claimed is:

1. A method for predicting and managing evacuations, the method comprising:

obtaining data associated with an event;

processing the data via an evacuation prediction and management engine to obtain an evacuation prediction;

when the evacuation prediction indicates that an evacuation order is likely to be issued within a period of time based on the event occurring, transmitting, via the evacuation prediction and management engine, an evacuation service offering to a user device;

upon a user of the user device confirming acceptance of the evacuation service offering, receiving a first payment from the user for the evacuation service offering; and when the event or evacuation order occurs and based on the first payment for the evacuation service offering, automatically initiating a second payment to a user account.

2. The method of claim 1, wherein the data is received from a third-party oracle.

3. The method of claim 2, wherein the data is confirmed to be accurate via recordation on a blockchain network.

4. The method of claim 2, wherein the data relates to at least one of climate data or political data.

5. The method of claim 1, wherein the evacuation service offering is structured based at least in part on at least one of a loss modeling, a probability of the event actually occurring, a location of the user, how many users have purchased the evacuation service offering, availability of one or more services, whether the user has existing insurance, a predetermined destination for the user, user modular selections from a service offering, or whether the user has accepted a request to participate in one or more other supportive services.

6. The method of claim 1, wherein the evacuation prediction and management engine predicts, based on at least one of climate data or political data, whether the evacuation order is likely to be issued.

7. The method of claim 1, wherein the evacuation prediction and management engine predicts, based on at least one of political data or other event-related data, whether the evacuation order is likely to be issued.

8. The method of claim 7, wherein the other event-related data is associated with at least one of an earthquake, a fire, smoke, a pandemic, a weather-event, or political unrest.

9. The method of claim 1, wherein the evacuation service offering is customizable for the user with respect to at least one of cost, a set of evacuation services offered, a location of the user, a destination of the user in case of evacuation, a need for automatic booking of a hotel, or a need for food services.

10. The method of claim 1, wherein when the event occurs and based on the first payment for the evacuation service offering, the method further comprises at least one of:

accessing critical data associated with the user;

automatically booking a hotel for the user; or receiving input from the user associated with the evacuation service offering and tailoring, based on the input, a service of the evacuation service offering.

11. The method of claim 1, wherein the method is performed by a smart contract operating on a blockchain network.

12. The method of claim 11, wherein the blockchain network comprises a plurality of computer nodes each operating an instance of a consensus algorithm and an instance of a distributed ledger, and wherein the method further comprises:

automatically initiating the second payment to a user account occurs only after the smart contract confirms the event and a transaction is recorded on the distributed ledger after confirmation of the consensus algorithm.

13. The method of claim 1, further comprising:

confirmation, via an interaction of the user with the user device, of at least one of a new location of the user or one or more purchases associated with the evacuation service offering.

14. The method of claim 1, wherein the evacuation prediction and management engine coordinates with at least one of a hotel booking service, a car rental services, a food industry service, a map service, an airline service, a personal home booking service, banking services, communication services, or emergency services.

15. The method of claim 1, further comprising:

confirming, by the evacuation prediction and management engine, that the user does not already have insurance coverage for an evacuation.

16. The method of claim 1, wherein the evacuation prediction and management engine coordinates with a communication service and ensures that the user has data bandwidth during the evacuation.

17. The method of claim 1, wherein the method further comprises, when the event occurs and based on the first payment for the evacuation service offering, transmitting an evacuation route to the user device to guide the user to a destination.

18. The method of claim 17, wherein the evacuation prediction and management engine distributes users across at least one of one or more different routes or to one or more different destinations during an evacuation to reduce traffic issues.

19. A tangible non-transitory computer-readable storage media storing computer-executable instructions which, when executed by a computing device, causes the computing device to perform operations comprising:

obtaining data associated with an event;

processing the data via an evacuation prediction and management engine to obtain an evacuation prediction;

when the evacuation prediction indicates that an evacuation order is likely to be issued within a period of time based on the event occurring, transmitting, via the evacuation prediction and management engine, an evacuation service offering to a user device;

upon a user of the user device confirming acceptance of the evacuation service offering, receiving a first payment from the user for the evacuation service offering; and when the event or evacuation order occurs and based on the first payment for the evacuation service offering, automatically initiating a second payment to a user account.

20. A system for implementing an evacuation process, the system comprising:

at least one processor; and a computer-readable storage medium storing instructions which, when executed by the at least one processor, cause the at least one processor to perform operations comprising:

obtaining data associated with an event;

processing the data via an evacuation prediction and management engine to obtain an evacuation prediction;

when the evacuation prediction indicates that an evacuation order is likely to be issued within a period of time based on the event occurring, transmitting, via the evacuation prediction and management engine, an evacuation service offering to a user device;

upon a user of the user device confirming acceptance of the evacuation service offering, receiving a first payment from the user for the evacuation service offering; and when the event or evacuation order occurs and based on the first payment for the evacuation service offering, automatically initiating a second payment to a user account.

* * * * *